June 6, 1961 E. C. KIEKHAEFER 2,987,156
MAGNETICALLY ACTUATED CLUTCH
Filed Dec. 30, 1958

INVENTOR.
ELMER C. KIEKHAEFER
BY
*Andrus & Starke*
Attorneys 2,987,156
MAGNETICALLY ACTUATED CLUTCH
Elmer Carl Kiekhaefer, 157 Western Ave., Cedarburg, Wis.
Filed Dec. 30, 1958, Ser. No. 783,882
1 Claim. (Cl. 192—58)

This invention relates to a magnetically actuated clutch, and more particularly to a rotary clutch utilizing the centrifugal action of flowable material for its operation.

The invention is based on the concept of disposing a magnetically permeable material between the driving member and the driven member of a centrifugal clutch and permitting centrifugal action and magnetic forces to selectively position the material therebetween for control of the clutch.

The accompanying drawing illustrates the best mode presently contemplated by the inventor for carrying out the invention.

Figure 1:
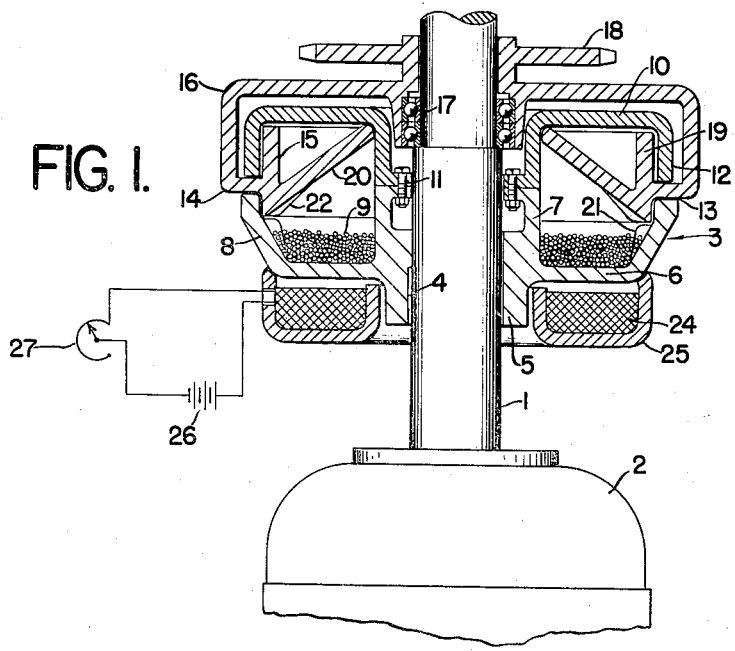
FIGURE 1 is a vertical central section of the clutch with the electric control shown diagrammatically.
Figure 2:
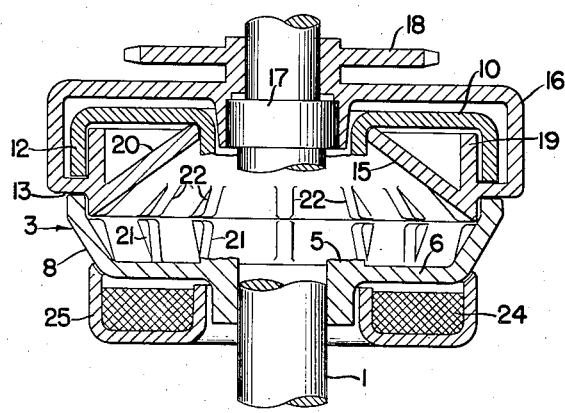
FIGURE 2 is a view similar to FIGURE 1 with certain central elements broken away for purposes of clarity.

As shown in the drawing, the clutch comprises a centrally disposed vertical input shaft 1 which is drivingly connected at one end to a suitable motor 2 or the like. Shaft 1 provides the rotary motive force for a circular drive member 3 which is keyed to the lower portion of the shaft at 4.

Member 3 is shown as having a central core 5 which merges radially outwardly into an annular horizontal support 6 and longitudinally upwardly into an inner axially extending vertical wall 7. The outer edge of support 6 is contoured upwardly to form an outer retaining wall 8.

Support 6 and walls 7 and 8 cooperate to form an annular groove or recess of relatively substantial size and adapted to receive magnetically permeable material such as a plurality of ferrous balls 9. Balls 9 are confined within the clutch by an annular cap 10 which forms a chamber for retention of the balls. To secure cap 10 to drive member 3, the upper end of wall 7 is flanged radially inwardly to receive a complementary flange on cap 10, and the flanges are secured together as by a plurality of circumferentially disposed bolts 11.

The outer wall 12 of cap 10 extends axially downwardly to face the end of wall 8, and terminates thereabove to provide a space 13 for mounting the base 14 of an annular friction ring 15 in the gap therebetween. Base 14 is secured to the outer end portion of the driven member 16 of the clutch.

Member 16 is mounted for rotation independent of shaft 1 on a plurality of suitable bearings 17, and is concentric with drive member 3. The output of member 16 is shown as a sprocket portion 18, although any suitable output means may be utilized.

Friction ring 15 is disposed within the hollow clutch chamber and comprises a generally V-shaped annular member having a vertically extending wall 19 disposed adjacent wall 12, and an angularly disposed wall 20. Wall 20 extends upwardly from closely adjacent base 14 to adjacent the upper inner corner portion of cap 10.

Retaining wall 8 and angular wall 20 provide substantially continuous surfaces within the chamber, except for the presence of a plurality of spaced radially extending vanes 21 and 22, mounted on walls 8 and 20, respectively.

When motor 2 is actuated, drive member 3 will be rotated by shaft 1, and the rotary motion will cause the loosely flowable balls 9 to be thrown by centrifugal force outwardly and upwardly between vanes 21 which in turn will throw the balls against vanes 22. The balls will strike vanes 22 and wall 20 in the direction of rotation of member 3, which will impart a circumferentially acting force through ring 15 to driven member 16 to rotate the latter. The force is applied a substantial distance outwardly from the axis of rotation of member 16, and adjacent its outer periphery.

Figure 3:
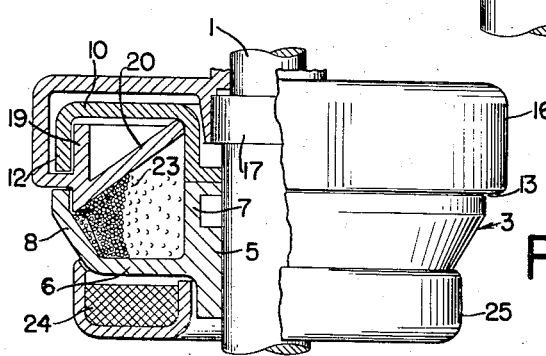
FIGURE 3 is a side elevation of the clutch with parts broken away and sectioned and showing the magnetically permeable material in driving position.

Balls 9 will flow continuously from support 6, will strike vanes 22 and wall 20, and will fall back onto the support, thus creating a continuous ball flow. The position taken by the balls during rotation of member 3 is shown at 23 in FIGURE 3.

It is also desirable to engage and disengage the clutch while motor 2 continues running. To this end, an electrically energized magnet coil 24 is disposed in a fixed annular trough 25 disposed directly beneath support 6, the latter forming the clutch chamber floor. Coil 24 is connected in circuit with a source of electric potential, such as a battery 26, and an on-off rheostat switch 27.

Assuming switch 27 to be in the "off" position, and motor 2 operating, balls 9 will be driving member 16. If switch 27 is now moved to the "on" position, coil 24 will be energized to provide a magnetic field which will attract balls 9 and draw them downwardly to their normal position out of engagement with friction ring 15. The driven member 16 will then stop rotating. De-energization of coil 24 by switch 27 will permit balls 9 to return to their driving motion.

The rheostat control of switch 27 permits adjustment in ball control as where variations in output speed or power are required.

Wall 20 and vanes 22, if desired, may be provided with a hard wear-resistant surface.

The invention provides a novel clutch mechanism utilizing centrifugal and magnetic forces for control thereof. It is especially suitable for use where a certain amount of slippage is desired or expected.

Various modes of carrying out the invention are contemplated as being within the scope of the following claim particularly pointing out and distinctly claiming the subject matter which is regarded as the invention.

I claim:

In a centrifugal clutch having a rotary driven input shaft disposed on a vertical axis; an annular drive member having a central core keyed to said shaft with said core merging radially outwardly into an annular horizontal support and upwardly along said shaft to form an inner vertical wall, said drive member having an annular retaining wall extending upwardly from the outer end of said horizontal support, a plurality of small magnetically permeable balls normally disposed on said support between said inner wall and said retaining wall, an annular cap having an inner wall secured to said first-named inner wall and having an outer wall formed in a downwardly direction and with the end of said outer wall terminating a short distance above the end of said retaining wall to form a space, said drive member and said cap forming a ball-retaining chamber; an annular driven member mounted for rotation on said shaft above said drive member with said driven member extending through said space and into said chamber, said driven member having a generally V-shaped friction ring member disposed within said chamber, one wall of said friction ring member extending vertically and concentric with the outer wall of said cap, the second wall of said friction ring member extending generally diagonally upwardly within said chamber to adjacent the inner wall of said cap; motor means to drive said input shaft so that said balls will flow up onto said diagonally extending wall and fall back onto said support member to create a continuous ball flow rotating said driven member, a fixed annular trough disposed directly beneath said horizontal support, a magnetic coil disposed in said trough, and means to energize said coil to attract said balls in an axial direction away from said diagonally extending wall when said motor means is operating to thereby disengage the clutch.

References Cited in the file of this patent

UNITED STATES PATENTS

| | | |
|---|---|---|
| 1,914,618 | Rudqvist | June 20, 1933 |
| 2,829,747 | Morse | Apr. 8, 1958 |

FOREIGN PATENTS

| | | |
|---|---|---|
| 588,678 | Germany | Dec. 7, 1933 |
| 689,138 | Great Britain | Mar. 18, 1953 |
| 1,111,653 | France | Nov. 2, 1955 |
| 1,123,867 | France | June 18, 1956 |